Patented Sept. 12, 1944

2,357,926

UNITED STATES PATENT OFFICE 2,357,926

POLYMERIZATION

Lewis A. Bannon, Cranford, N. J., assignor to Standard Oil Development Company, a corporation of Delaware No Drawing. Application September 25, 1940, Serial No. 358,302

10 Claims. (Cl. 260—683.15)

This invention relates to the polymerization of hydrocarbons of the olefin series and other unsaturated compounds, and more particularly to the production of polymers of the lubricating oil range, by the use of a novel catalyst composition.

The use of gaseous boron fluoride for the polymerization of olefins, especially branched chain olefins, such as isobutylene, is well known. There are, however, certain disadvantages in the use of this catalyst. When it is attempted to polymerize the low molecular weight olefins, such as propylene, it is impossible to produce polymers except at extreme conditions of temperature and pressure. In the case of isobutylene, it is difficult to control the degree of polymerization to prevent the formation of very high molecular weight polymers. It is also difficult and costly to recover the boron fluoride catalyst. It is therefore a particular object of the present invention to provide a catalyst composition which will promote the polymerization of olefins, especially the lower olefins, at ordinary temperatures and pressures, and which will permit the formation of comparatively low molecular weight polymers of the lubricating oil range which will not be contaminated with high molecular weight polymers. It is a further object to provide a novel and efficient method for polymerizing aliphatic unsaturated compounds generally to form products of the lubricating oil range. It is a still further object of the invention to provide a catalyst which can be very readily separated from the product and returned to the reaction zone.

The new catalyst of the present invention consists of a liquid comprising boron fluoride and water. In general, it is preferred to use a composition in which the amount of water present varies from one to five mols per mol of boron fluoride. The catalyst is readily prepared by bubbling boron fluoride gas into water while keeping the mixture cool with ice or rapidly circulating cold water. By the use of this boron fluoride-water catalyst it is possible to polymerize low molecular weight olefins, such as ethylene and propylene, at ordinary temperatures to give good yields of polymers suitable for use as lubricating oils. Higher molecular weight polymers may, on the other hand, be produced by employing subnormal temperatures. This catalyst has a further great advantage in the fact that it readily separates from the polymer product and may be returned for further use. Troublesome and costly means for removing boron fluoride gas from the product are thus avoided.

The present invention is applicable to the polymerization, not only of the lower molecular weight olefins, but also higher molecular weight materials, such as unsaturated polymers and cracked wax, also diolefins and unsaturated aliphatic compounds generally, including unsaturated aliphatic hydrocarbons in which one or more hydrogen atoms have been substituted with halogens, inorganic acid radicals or organic radicals of all types. Typical of this wider group of materials are isoprene, methallyl chloride, methyl vinyl ketone, vinyl ethers and esters, and vegetable oils containing unsaturated fatty compounds, e. g., corn oil. It applies also to the polymerization of unsaturated compounds in admixture with saturated compounds, as in olefin-containing gases, such as the $C_4$ and $C_5$ cuts obtained by the fractionation of cracked petroleum products. The new catalyst is also useful in the copolymerization of various olefins with other aliphatic unsaturated compounds, for example, in the copolymerization of acetylene with propylene to form isoprene, as well as in the copolymerization of isobutylene with pentene, isobutylene with butadiene, isobutylene with corn oil, butadiene with acrylic nitrile, etc.

Temperature and pressure conditions are chosen so that the boron fluoride-water catalyst always remains in the liquid phase. At atmospheric pressure a saturated solution of boron fluoride in water, i. e., a mixture containing a 1:1 ratio of water to boron fluoride, freezes at about —23° C. It is ordinarily desirable, therefore, not to employ temperatures lower than about —20° C. On the other hand, temperatures as high as about 40° C., and even up to 55° C. under some conditions, may be used in the preparation of products in the lubricating oil boiling range from gaseous olefins. While these comparatively low temperatures favor the production of higher molecular weight products, such as lubricating oil, in accordance with the present invention, higher temperatures generally lead to the formation of lower molecular weight products, e. g., gas oil or gasoline. When operating at the preferred temperatures for preparing lubricating oils, ratios of water to boron fluoride of the order of 1:1 to 2:1 are most desirable, although ratios as high as 5:1 may sometimes be used. A wide range of pressure may be employed, i. e., from atmospheric up to 50 atmospheres or even higher. In general, increase of pressure increases the molecular weight of the product produced at a given temperature. High pressures also increase the reaction rate.

It has been found that the viscosity index of the product varies somewhat with the temperature of the reaction. For example, normal room temperatures seem to give the highest viscosity index oils from propylene, while the temperature giving highest viscosity index oils from normal butylene is about 65° C.

The process of this invention may be readily carried out, in the case of polymerization of gaseous olefins, by simply bubbling the hydrocarbon through the liquid catalyst. The polymer product collects as an upper layer or emulsion and may be removed and separated from the catalyst which is mixed or emulsified therewith by standing or by centrifuging. A suitable form of apparatus is a tower either packed with glass or other suitable material or provided at the bottom with a porous thimble for the introduction of the hydrocarbon gas. The tower is preferably surrounded with a cooling jacket for the control of the reaction temperature. The temperature may also be controlled by the use of a diluent which boils at the reaction temperature and pressure, such as butane, pentane, and other paraffins, or water itself may be refluxed to the reaction zone when the reaction is conducted under suitably high temperatures. Means are provided for the removal of the product at the side as it collects and for the removal of unreacted gases at the top. The method is well adapted for continuous operation, during which the olefin gas is continuously introduced into the tower, and the product is continuously removed and separated from entrained catalyst solution, the latter being separated from the product and returned continuously or intermittently. Means may be provided for continuously adding fresh boron fluoride to make up for small losses occurring during the process.

In cases where a liquid olefin material is to be polymerized, the reaction may also be carried out by adding the liquid gradually to the catalyst solution while maintaining vigorous agitation.

The process of the present invention may be illustrated by the following examples:

EXAMPLE 1

A reaction was carried out in accordance with the general procedure described above by passing propylene through a thimble into a tower containing a boron fluoride-water mixture containing one mol of water per mol of boron fluoride. The reaction was continued for about six days at atmospheric pressure at a temperature varying from 20° to 25° C. The catalyst which was removed with the product was separated by standing and returned to the reactor intermittently. Toward the end of the run the catalyst became somewhat weakened and the reaction rate was reduced. The total product at the end of the run represented a yield of 80% based upon the propylene feed. The polymer was steam distilled up to 200° C. The residue, representing a yield of 41% of oil based on the total polymer product, had a Saybolt viscosity of 662.4 seconds at 100° F. and 66.1 seconds at 210° F. and a viscosity index of 78. For comparison, propylene and gaseous boron fluoride were simultaneously led into carbon tetrachloride at room temperature for several hours. Only a trace of polymer was formed.

EXAMPLE 2

In three batch runs propylene was passed through a porous thimble into a tower which was maintained at pressures in the neighborhood of 100 pounds per square inch and at temperatures of 25°, 39° and 55° C., as shown by the accompanying table. The tower contained a boron fluoride-water catalyst having a boron fluoride-water ratio of 1:1. In each case the propylene was bubbled in continuously during the run, and the product was allowed to accumulate in the top of the tower and was removed at the end of the run. The product was separated from the aqueous catalyst by standing and was steam distilled up to 200° C. The residue was tested for its viscosity characteristics with the results as shown in the table below. The products from the runs conducted at 39° and 55° C., after being separated from the catalyst, were washed with an aqueous caustic solution before being steam distilled. The yields were not determined accurately, but were of the order of that obtained in Example 1. The temperature and pressure conditions, time of run and properties of the final product are shown in the following table:

*Table*

| Run No. | Time of run | Temp. | Pressure | Oil characteristics | | |
|---|---|---|---|---|---|---|
| | | | | Viscosity at 100° F. | (Saybolt) at 210° F. | Viscosity index |
| | | °C. | Lbs./sq. in. | | | |
| 1 | 5 days | 25 | 90–100 | 880.5 | 70.2 | 54 |
| 2 | 3 hours | 39 | 75–100 | 484.5 | 57.2 | 65 |
| 3 | 2 hours | 55 | 90–100 | 296.6 | 48.8 | 56 |

EXAMPLE 3

Pentene was polymerized by passing it into a tower containing a boron fluoride-water catalyst having a ratio of one mol of boron fluoride to one mol of water at atmospheric pressure and at a temperature of 3° to 10° C. The product was separated from the catalyst and vacuum distilled up to 180° C. at 5 mm. pressure. The residue was an oil having a Saybolt viscosity of 894.2 seconds at 100° F. and 57.5 seconds at 210° F. and a viscosity index of −70. The yield was of the order of that obtained in Example 1. For comparison, an attempt was made to polymerize pentene by treating with boron fluoride gas for several hours. Only a trace of polymer was formed.

This invention is not to be considered as limited by any of the examples described above, which are given for illustrative purposes only, but is limited only by the terms of the appended claims.

I claim:

1. A process for the polymerization of olefins to form a product having a viscosity at least as high as that of a lubricating oil which comprises contacting the olefins at a temperature below 40° C. with a liquid catalyst comprising boron fluoride and water.

2. A process for the polymerization of olefins to form a product having a viscosity at least as high as that of a lubricating oil which comprises contacting the olefins at a temperature below 40° C. with a liquid catalyst consisting of one molecular proportion of boron trifluoride and one to five molecular proportions of water.

3. A process for the polymerization of olefins to form a product of the lubricating oil range which comprises contacting the olefins at a temperature below 40° C. with a liquid catalyst comprising boron fluoride and water at a pressure from 1 to 50 atmospheres.

4. A process for the polymerization of olefin-containing gases resulting from the cracking of hydrocarbon oils to form a product of the lubricating oil range which comprises bubbling an olefin-containing gas into a reaction chamber containing a liquid catalyst at a temperature below 40° C., said catalyst consisting of one molecular proportion of boron trifluoride and from one to five molecular proportions of water.

5. A process for the continuous polymerization of olefin-containing gases resulting from the cracking of hydrocarbon oils to form a product of the lubricating oil range which comprises continuously bubbling an olefin-containing gas into a reaction chamber containing a liquid catalyst at a temperature below 40° C., said catalyst consisting of one molecular proportion of boron trifluoride and from one to five molecular proportions of water, and continuously removing from said reaction chamber the polymeric compounds produced.

6. A process for the polymerization of normally gaseous olefins to form a product having a viscosity at least as high as that of a lubricating oil which comprises contacting the olefins with a liquid catalyst consisting of boron fluoride and water in the ratio of one mol of boron fluoride to one to five mols of water, at a pressure of 1 to 50 atmospheres and a temperature higher than —20° C. but lower than 40° C.

7. A process for the polymerization of normally gaseous olefins to form a product having a viscosity at least as high as that of a lubricating oil which comprises contacting the olefins with a liquid catalyst consisting of boron fluoride and water in the ratio of about one mol of boron fluoride to one mol of water, at atmospheric pressure and at a temperature higher than —20° C. but lower than 40° C.

8. A process for producing a lubricating oil from propylene which comprises contacting the propylene with a liquid catalyst consisting of boron fluoride and water in the ratio of about one mol of boron fluoride to one mol of water, at atmospheric pressure and at a temperature of 20 to 25° C.

9. A process for the polymerization of compounds having an aliphatic olefinic linkage to form a product having a voscosity at least as high as that of a lubricating oil which comprises contacting the said compounds at a temperature below 40° C. with a liquid catalyst comprising boron fluoride and water.

10. A process for the polymerization of olefins to form a product of the lubricating oil range which comprises contacting the olefins at a temperature below 40° C. with a liquid catalyst consisting of one molecular proportion of boron trifluoride and one to two molecular proportions of water.

LEWIS A. BANNON.